United States Patent
Suh et al.

(10) Patent No.: US 11,864,034 B2
(45) Date of Patent: Jan. 2, 2024

(54) METHOD AND APPARATUS FOR PROVIDING ACCESS TRAFFIC STEERING FUNCTION IN WIRELESS COMMUNICATION SYSTEM

(71) Applicant: Samsung Electronics Co., Ltd., Suwon-si (KR)

(72) Inventors: Dongeun Suh, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/157,757

(22) Filed: Jan. 20, 2023

(65) Prior Publication Data
US 2023/0156533 A1    May 18, 2023

Related U.S. Application Data

(63) Continuation of application No. 17/200,590, filed on Mar. 12, 2021, now Pat. No. 11,564,132.
(Continued)

(30) Foreign Application Priority Data

Mar. 31, 2020 (KR) .......... 10-2020-0039394
Apr. 3, 2020 (KR) .......... 10-2020-0041215

(51) Int. Cl.
*H04W 36/00* (2009.01)
*H04W 24/02* (2009.01)
(Continued)

(52) U.S. Cl.
CPC ....... *H04W 36/0033* (2013.01); *H04W 24/02* (2013.01); *H04W 36/0027* (2013.01); *H04W 76/16* (2018.02); *H04W 88/06* (2013.01)

(58) Field of Classification Search
CPC . H04W 76/16; H04W 88/06; H04W 36/0027; H04W 60/005; H04W 36/14;
(Continued)

(56) References Cited

U.S. PATENT DOCUMENTS

2019/0306068 A1    10/2019   Kiss et al.
2019/0373505 A1    12/2019   Jun et al.
(Continued)

FOREIGN PATENT DOCUMENTS

CN           113079586 A         7/2021
KR    10-2019-0136948 A         12/2019
(Continued)

OTHER PUBLICATIONS

International Search Report of the International Searching Authority dated Jun. 16, 2021 in connection with International Application No. PCT/KR2021/003093, 3 pages.
(Continued)

*Primary Examiner* — Nam T Huynh

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure proposes, when a UE is registered in an AMF which does not support ATSSS (registration procedure), a method by which, an old AMF identifies the registration and releases an MA PDU session and a method
(Continued)

by which the UE identifies the registration and releases the MA PDU session in a wireless communication system according to an embodiment.

14 Claims, 12 Drawing Sheets

Related U.S. Application Data

(60) Provisional application No. 62/988,806, filed on Mar. 12, 2020.

(51) Int. Cl.
*H04W 76/16* (2018.01)
*H04W 88/06* (2009.01)

(58) Field of Classification Search
CPC .. H04W 48/18; H04W 76/15; H04W 36/0033
See application file for complete search history.

(56) References Cited

U.S. PATENT DOCUMENTS

| | | |
|---|---|---|
| 2019/0394279 A1 | 12/2019 | Dao et al. |
| 2019/0394833 A1 | 12/2019 | Talebi Fard et al. |
| 2020/0187061 A1 | 6/2020 | Zhu et al. |
| 2022/0132454 A1* | 4/2022 | Youn ............... H04W 76/32 |

FOREIGN PATENT DOCUMENTS

| | | |
|---|---|---|
| WO | 2019032972 A1 | 2/2019 |
| WO | 2019033796 A1 | 2/2019 |
| WO | 2019161240 A1 | 8/2019 |

OTHER PUBLICATIONS

European Search Report dated Aug. 23, 2021 in connection with European Application No. 21162306.1, 10 pages.
Ericsson et al: "Notification of the change of the PCF," C4-187580 was C4-187469, 3GPP TSG CR WG4 Meeting #86bis, Vilnius, Lithuania, Oct. 15-19, 2018, 6 pages.
Mediatek Inc., "Discussion on the UP Establishment on the second access of a MA PDU Session in an ATSSS-incapable VPLMN," S2-2000826 Agenda Item 7.3, 3GPP TSG SA2#136AH, Incheon, Korea, Jan. 13-17, 2020, 11 pages.
Samsung, "Handling MA PDU Sessions over ATSSS-incapable AMF," S2-2001960, 3GPP TSG-SA2 Meeting #137-E, Online, Feb. 24-27, 2020, 2 pages.

* cited by examiner

METHOD AND APPARATUS FOR PROVIDING ACCESS TRAFFIC STEERING FUNCTION IN WIRELESS COMMUNICATION SYSTEM

CROSS-REFERENCE TO RELATED APPLICATIONS

This application is a continuation of U.S. patent application Ser. No. 17/200,590 filed on Mar. 12, 2021, which is based on and claims priority under 35 U.S.C. 119 to Korean Patent Application No. 10-2020-0039394 filed on Mar. 31, 2020 and Korean Patent Application No. 10-2020-0041215 filed on Apr. 3, 2020 in the Korean Intellectual Property Office, which claims the benefit of U.S. Provisional Patent Application No. 62/988,806 filed on Mar. 12, 2020 in the U.S. Patent and Trademark Office, the disclosures of which are herein incorporated by reference in their entirety.

BACKGROUND

1. Field

The disclosure relates to a method and apparatus for providing access traffic steering (Access Traffic Steering, Switching, Splitting (ATSSS)) function in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In a 5G communication system, the connection with various access networks such as New Radio (NR), wireless LAN, wired LAN, and the like is supported. At this time, an access traffic steering (ATSSS) technology is a technology that enables traffic transmission using different access networks and is currently being developed.

The above information is presented as background information only to assist with an understanding of the disclosure. No determination has been made, and no assertion is made, as to whether any of the above might be applicable as prior art with regard to the disclosure.

SUMMARY

In order to use ATSSS in a communication system complying with the current 3GPP standard, a User Equipment (UE), an Access and Mobility Management Function (AMF), a Session Management Function (SMF), and a User Plane Function (UPF) should support the function. When the UE is registered in a new AMF due to movement of the UE in the state in which the UE establishes one or more Multi Access Packet Data Unit (MAPDU) sessions through an old AMF, if the new AMF does not support ATSSS, the MA PDU sessions for the corresponding access should be necessarily released. A technology for releasing the MA PDU session does not exist at present, and the disclosure proposes a method and an apparatus for solving the problem.

In a wireless communication system according to an embodiment, when a User Equipment (UE) is registered in an Access and Mobility Management Function (AMF) which does not support ATSSS (registration procedure), a conventionally registered AMF may identify the registration and release the old MA PDU session or the UE may identify the registration and release the old MA PDU session.

In accordance with an aspect of the disclosure, a method performed by first access and mobility management function (AMF) entity in a wireless communication system is provided. The method includes receiving a first message including information on supported features of a second AMF entity; identifying whether the second AMF entity supports an access traffic steering, switching, splitting (ATSSS) function based on the information; transmitting, to the second AMF entity, a second message including a user equipment (UE) context, wherein the UE context does not include a context for a multi-access packet data unit (MA PDU)

session, in case that the second AMF entity does not support the ATSSS function; and transmitting, to a session management function (SMF) entity, a third message requesting to release the MA PDU session, wherein the MA PDU session is released based on the third message.

In the method, the first message is received from the second AMF entity, and the first message is a message for requesting to transfer the UE context stored in the first AMF entity to the second AMF entity.

In the method, the first message is provided by a network repository function (NRF) entity, the first AMF entity is a source AMF entity associated with a handover, and the second AMF entity is a target AMF entity associated with the handover.

Further, the method includes receiving, from the second AMF entity, a fourth message notifying that the handover is successful, wherein the third message is transmitted after the fourth message is received.

In the method, the first message includes a network function (NF) profile of the second AMF entity, the NF profile including the information.

In accordance with another aspect of the disclosure, a first access and mobility management function (AMF) entity in a wireless communication system is provided. The first AMF entity includes a transceiver configured to transmit and receive a signal; and a controller coupled with the transceiver and configured to: receive a first message including information on supported features of a second AMF entity, identify whether the second AMF entity supports an access traffic steering, switching, splitting (ATSSS) function based on the information, transmit, to the second AMF entity, a second message including a user equipment (UE) context, wherein the UE context does not include a context for a multi-access packet data unit (MA PDU) session, in case that the second AMF entity does not support the ATSSS function, and transmit, to a session management function (SMF) entity, a third message requesting to release the MA PDU session, wherein the MA PDU session is released based on the third message.

In accordance with another aspect of the disclosure, a method performed by a session management function (SMF) entity in a wireless communication system is provided. The method includes receiving, from a first access and mobility management function (AMF) entity, a first message requesting to release a multi-access packet data unit (MA PDU) session based on information on supported features of a second AMF entity; and releasing the MA PDU session based on the first message, wherein the information indicates whether the second AMF entity supports an access traffic steering, switching, splitting (ATSSS) function, and wherein, in case that the second AMF entity does not support the ATSSS function based on the information, a second message including a user equipment (UE) context is delivered to the second AMF entity, and the UE context does not include a context for the MA PDU session.

In accordance with another aspect of the disclosure, a session management function (SMF) entity in a wireless communication system is provided. The SMF entity includes a transceiver configured to transmit and receive a signal; and a controller coupled with the transceiver and configured to: receive, from a first access and mobility management function (AMF) entity, a first message requesting to release a multi-access packet data unit (MA PDU) session based on information on supported features of a second AMF entity, and release the MA PDU session based on the first message, wherein the information indicates whether the second AMF entity supports an access traffic steering, switching, splitting (ATSSS) function, and wherein, in case that the second AMF entity does not support the ATSSS function based on the information, a second message including a user equipment (UE) context is delivered to the second AMF entity, and the UE context does not include a context for the MA PDU session.

The disclosure supports various schemes for releasing MA PDU sessions which cannot be supported by a 3GPP 5G system. When the UE is registered in an AMF which does not support ATSSS on the basis of embodiments of the disclosure, the old MA PDU sessions may be efficiently released.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
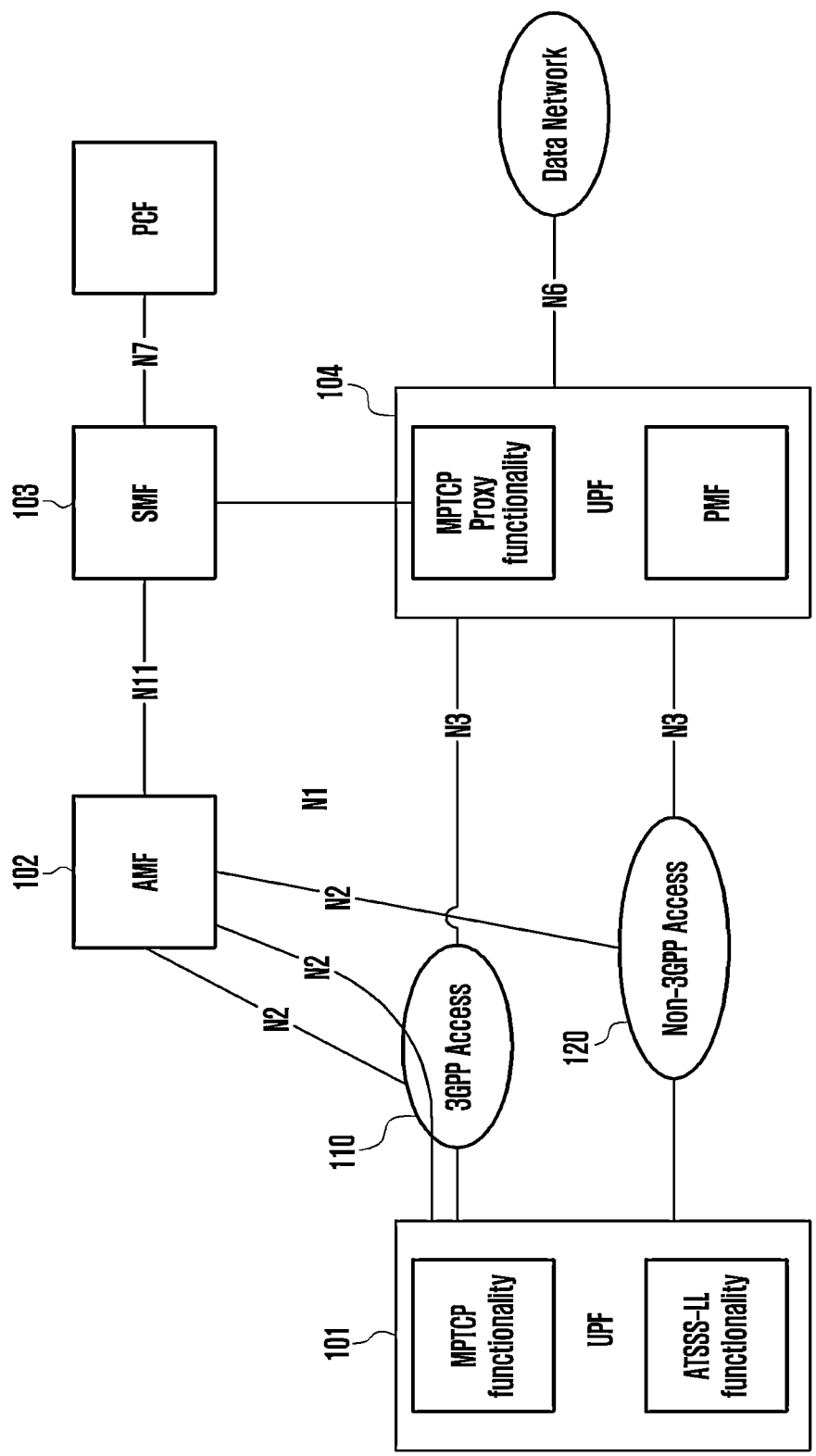
FIG. 1 illustrates the architecture of a system which supports ATSSS in a 3GPP 5G system.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

The disclosure relates to a method and an apparatus for supporting various services in a wireless communication system. Specifically, the disclosure describes a technology for providing an access traffic steering (Access Traffic Steering, Switching, Splitting (ATSSS)) function in a wireless communication system.

As used in the following description, terms for identifying access nodes, terms referring to network entities or network functions (NFs), terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

FIG. 1 illustrates the system architecture for supporting Access Traffic Steering, Switching, Splitting (ATSSS) in a 3GPP 5G system. Through the ATSSS function, traffic transmission can be performed through multiple paths (for example, 3GPP access 110 and non-3GPP access 120) between a Protocol Data Unit (PDU) (or a packet data unit) session anchor User Plane Function (UPF) 104 and a User Equipment (UE) 101 as illustrated in FIG. 1. Meanwhile, in order to use ATSSS, the User Equipment (UE) 101, an Access and Mobility Management Function (AMF) 102, a Session Management Function (SMF) 103, and a User Plane Function (UPF) 104 should support the ATSSS.

Figure 2:
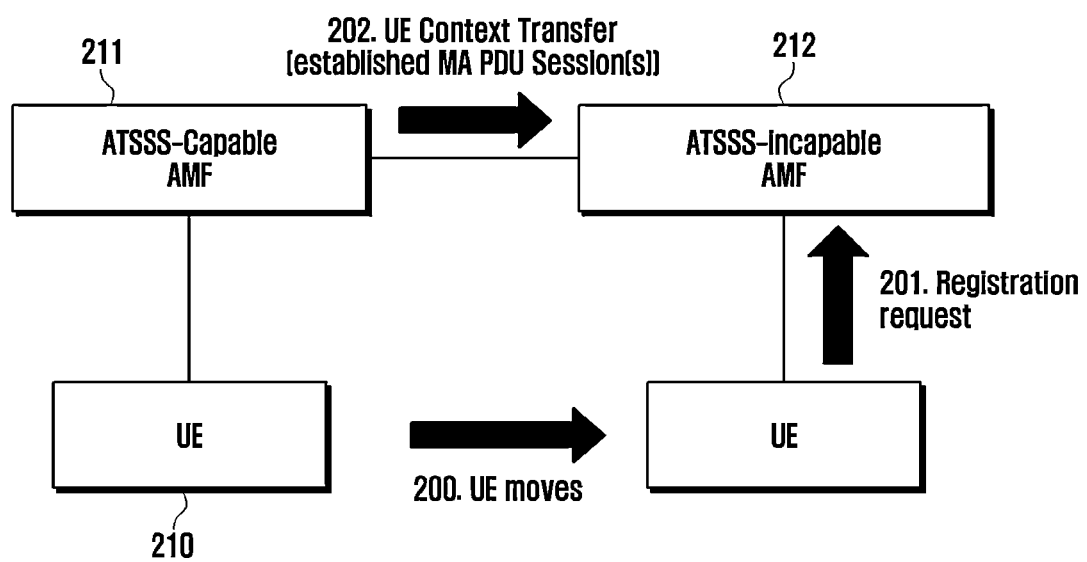
FIG. 2 illustrates a problem to be solved by the disclosure.

FIG. 2 illustrates a problem to be solved by the disclosure. FIG. 2 illustrates a situation in which a UE 210 registers to a new AMF 212 due to UE movement 200 in the state in which the UE 210 already established one or more MA PDU sessions with an old AMF 211. When the new AMF 212 does not support ATSSS (that is, ATSSS-incapable AMF), the old AMF 211 transmits context for the old MA PDU session to the new AMF through UE context transfer as indicated by reference numeral 202. At this time, although the new AMF does not support ATSSS, if the MA PDU session is not released, an unexpected operation may occur due to the existence of MA PDU sessions that are not released. Accordingly, for the efficient operation of the MA PDU session, MAPDU sessions for the corresponding access should be necessarily released. A technology for releasing the MA PDU session does not exist at present, and the disclosure proposes a method and an apparatus for solving the problem.

Figure 3:
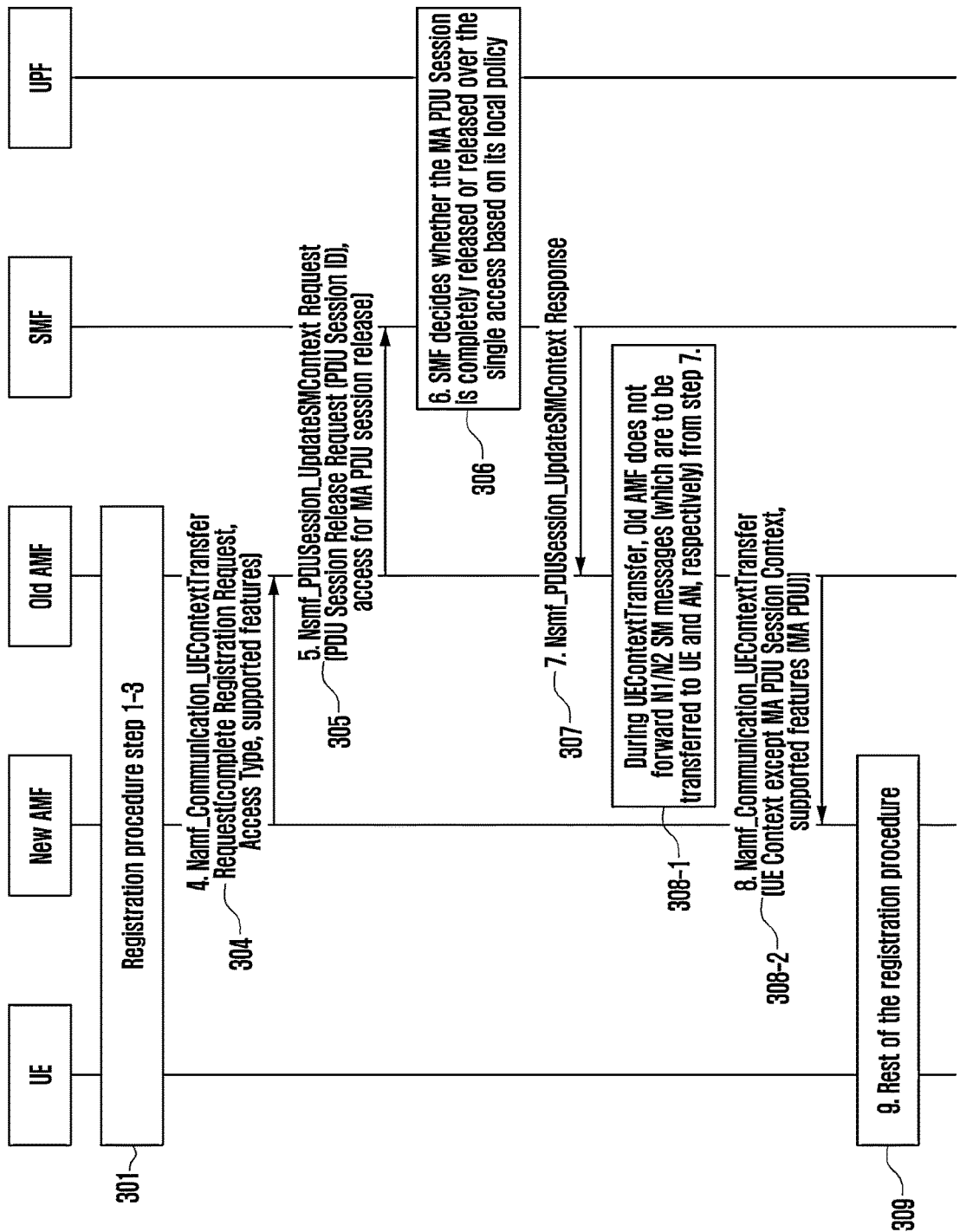
FIG. 3 illustrates a sequence diagram for a procedure in which an old AMF releases an old MA PDU session on the basis of an update SM context service.

FIG. 3 illustrates a method by which an old AMF releases an MA PDU session through UpdateSMContext according to an embodiment when a UE is registered in a new AMF which does not supports ATSSS.

Referring to FIG. 3, in step 301, the UE may transmit a registration request message to the new MAF in order to perform a registration process for the new AMF (steps 1 to 3). Specifically, the UE may transmit an Access Node (AN) message including the registration request message to an AN in step 1, and the AN receiving the AN message may determine an AMF in step 2 and transmit an N2 message including the registration request message to the determined AMF (that is, a new AMP) in step 3.

In step 304, the new AMF may transmit a Namf_Communication_UEContextTransfer request message to the old AMF. At this time, the corresponding message may include an access type and supported features of the UE. When the new AMF does not support ATSSS, the supported features do not include an MA PDU session support indicator.

When it is determined that the new AMF does not support ATSSS, the old AMF identifies whether there is an MA PDU session for the access type received in step 304 in UE context in step 305. When there is an MA PDU session for the received access type, the old AMF may perform an operation for releasing the MA PDU session for the access type for the SMF. Specifically, the old AMF may transmit a Nsmf_PDUSession_UpdateSMContext request message to the SMF. The Nsmf_PDUSession_UpdateSMContext request message may include information on an SM context ID, a release indication, and access for MA PDU session release. At this time, the SM context ID is a context identifier for an MA PDU session ID which should be locally released, and should be shared between the AMF and the SMF. The release indication is an indicator indicating a release request, and the access for MA PDU session release is an access type which should be released.

At this time, the old AMF may determine whether the new AMF supports ATSSS as follows: 1) an MA PDU session support indicator in a supported features field or parameter included in the request message of step 304, 2} an MA PDU session support indicator in a supported feature of an NF profile for the new AMF stored in a Network Repository Function (NRF), and 3) local configuration of the AMF Upon receiving the message of step 305 from the AMF, the SMF determines whether to release only the access type for receiving the MA PDU session mapped to the SM context ID or release all accesses through a local policy in step 306. The SMF may indicate to the UPF whether to release the MA PDU session only for one access or release MA PDU sessions for all accesses according to the determination result.

The SMF transmits a Nsmf_PDUSession_UpdateSMContext response message including the result of the request of step 305 to the old AMF in step 307.

Even though the response message from the SMF includes a message for making a request for transmission to the UE or the AN, the old AMF does not perform an operation such as transmission in step 308. The old AMF transmits UE context to the new AMF in response to the request message of step 304.

At this time, the old AMF does not insert context for MA PDU sessions successfully released from the message from the SMF into UE context to be transmitted to the new AMF.

In step 309, the remaining registration procedures of the UE are performed. When MA PDU session context missed in the UE context received in step 308 exists in the UE, the UE may locally release the MA PDU session existing only in the UE through a synchronization process with the new AMF.

Figure 4:
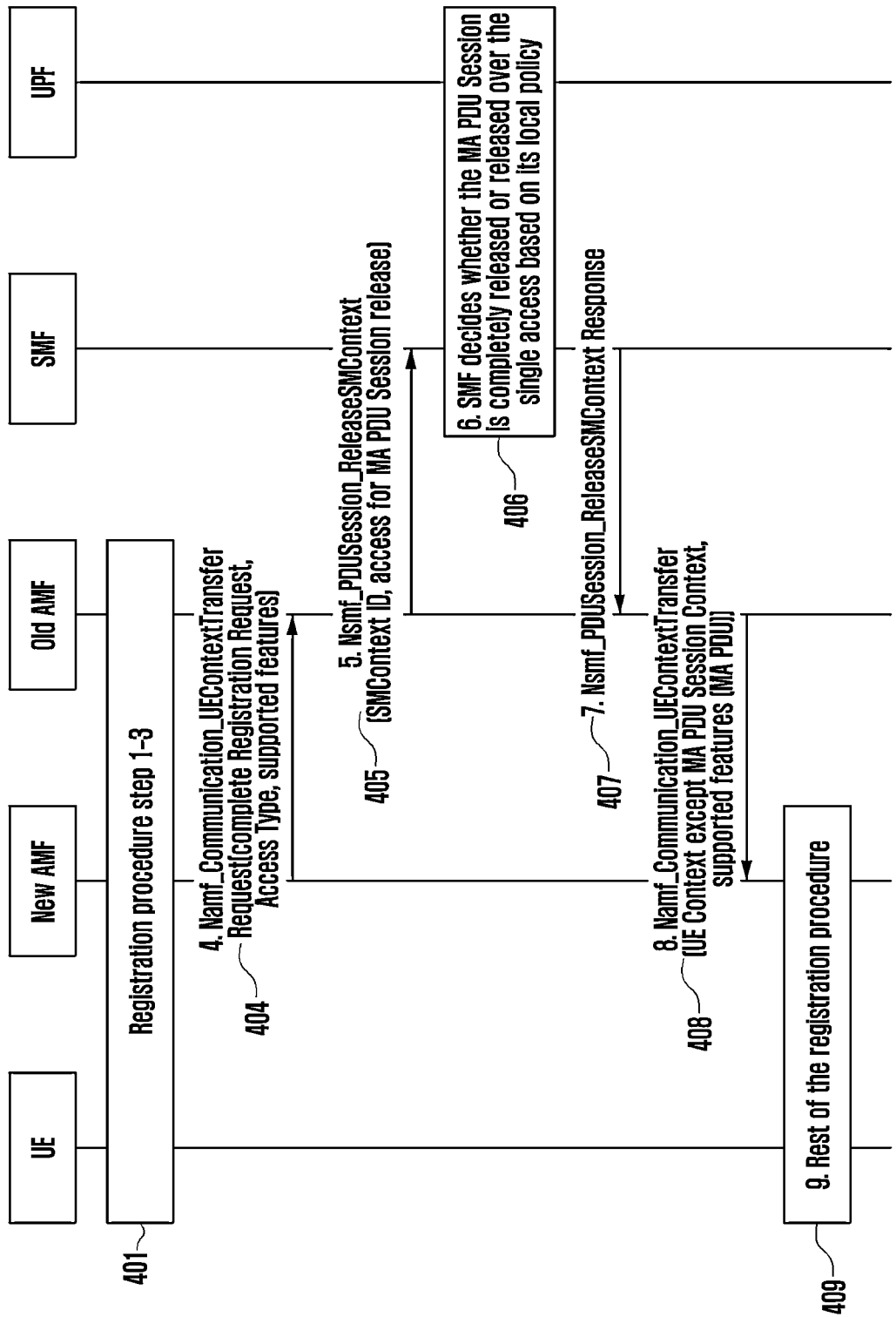
FIG. 4 illustrates a sequence diagram for a procedure in which an old AMF releases an old MA PDU session on the basis of a release SM context service.

FIG. 4 illustrates a method by which an old AMF releases an old MA PDU session through ReleaseSMContext according to an embodiment when a UE is registered in a new AMF which does not supports ATSSS.

Referring to FIG. 4, in step 401, the UE may transmit a registration request message to the new MAF in order to perform a registration process for the new AMF (steps 1 to 3). Specifically, the UE may transmit an Access Node (AN) message including the registration request message to an AN in step 1, and the AN receiving the AN message may determine an AMF in step 2 and transmit an N2 message including the registration request message to the determined AMF (that is, a new AMP) in step 3.

In step 404, the new AMF may transmit a Namf_Communication_UEContextTransfer request message to the old AMF. At this time, the corresponding message may include an access type and supported features of the UE. When the new AMF does not support ATSSS, the supported features do not include an MA PDU session support indicator.

When it is determined that the new AMF does not support ATSSS, the old AMF identifies whether there is an MA PDU session for the access type received in step 404 in UE context in step 405. When there is an MA PDU session for the received access type, the old AMF may perform an operation for releasing the MAPDU session for the access type for the SMF.

Specifically, the old AMF may transmit a Nsmf_PDUSession_Release request message to the SMF. The Nsmf_PDUSession_Release request message may include information on an SM context ID and access for MA PDU session release. At this time, the SM context ID is a context identifier for an MA PDU session ID which should be locally released, and should be shared between the AMF and the SMF. The access for MA PDU session release is an access type which should be released.

At this time, the old AMF may determine whether the new AMF supports ATSSS as follows: 1) an MA PDU session support indicator in a supported features included in the request message of step 404, 2) an MA PDU session support indicator in a supported feature of an NF profile for the new AMF stored in a Network Repository Function (NRF), and 3) local configuration of the AMF Upon receiving the message of step 405 from the AMF, the SMF determines whether to release only the access type for receiving the MA PDU session mapped to the SM context ID or release all accesses through a local policy in step 406. The SMF may indicate to the UPF whether to release only the access for the MA PDU session or release all accesses according to the determination result.

In step 407, the SMF transmits a Nsmf_PDUSession_ReleaseSMContext response including the result of the request of step 405.

In step 408, the old AMF transmits UE context to the new AMF in response to the request message of step 404.

At this time, the old AMF does not insert context for MA PDU sessions successfully released from the message from the SMF into UE context to be transmitted to the new AMF.

In step 409, the remaining registration procedures of the UE are performed. When MA PDU session context missed in the UE context received in step 408 exists in the UE, the UE may locally release the MA PDU session existing only in the UE through a synchronization process with the new AMF.

Figure 5:
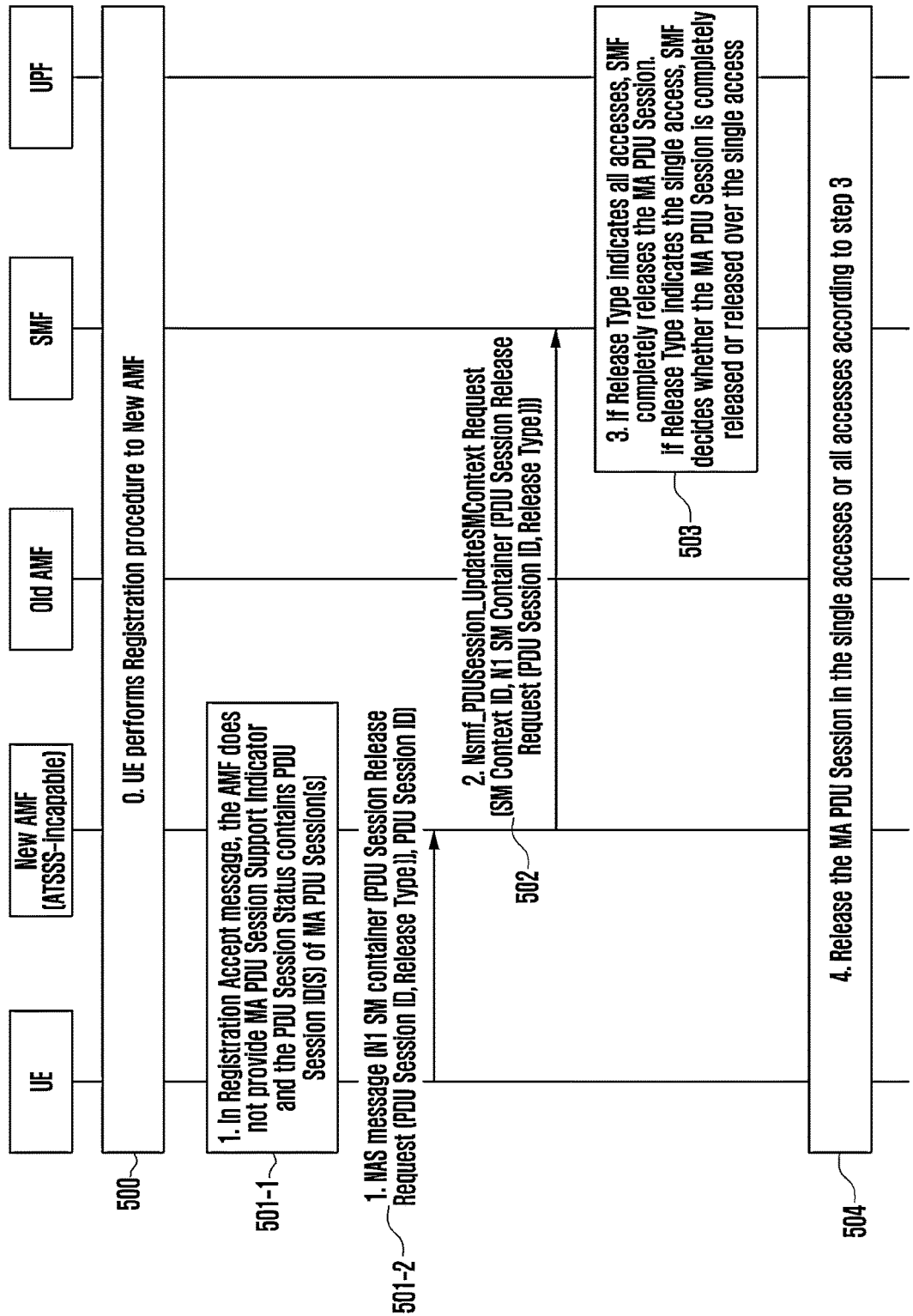
FIG. 5 illustrates a sequence diagram for a procedure for releasing an old MA PDU session on the basis of a PDU session release request including a specific request type of a UE.

FIG. 5 illustrates an MA PDU session release method through an MA PDU session release request including a specific request type of the UE according to an embodiment when the UE is registered in a new AMF which does not support ATSSS.

In step 500, the UE may perform a registration procedure of the new AMF. The registration procedure of the new AMF may be performed to be the same as the registration procedure of the new AMF according to the embodiments of FIGS. 3 and 4.

In step 501, when an MA PDU session support indicator is not included in a registration accept message and there is a PDU session ID of the MA PDU session for an access type for which the registration accept message is received in a PDU session status of the registration accept message (501-1), the UE may insert the PDU session ID and a request type into a PDU session release request message with respect to all of the corresponding PDU session IDs and transmit the PDU session release request message to the new AMF (501-2).

At this time, the release type is used to indicate an access type which the UE desires to release. When the UE desires to release the MA PDU session only for the access type for which the registration accept message is received, the release type may indicate the corresponding access type. When the UE desires to release MA PDU sessions for all accesses, the release type may be configured as an indicator making a request for releasing all accesses.

In step 502, the new AMF may transmit an N1 SM container received from the UE to the SMF through a Nsmf_PDUSession_UpdateSMContext request message. At this time, the new AMF also transmits an SM context ID mapped to the PDU session ID.

When the release type indicates to release all accesses, the SMF completely releases the corresponding MA PDU session in step 503. Meanwhile, when the release type indicates only one access type, the SMF may determine whether to release only the access type for which the MA PDU session mapped to the SM context ID or release all accesses through a local policy.

When it is determined to release only one access type on the basis of the determination of step 503, the SMF indicates to release the MA PDU session for the corresponding access type to the UE, the Access Network (AN), and the UPF in step 504.

Meanwhile, when it is determined to release all access types on the basis of the determination of step 503, the SMF indicates to release the MA PDU session for all access types to the UE, the Access Network (AN), and the UPF.

Figure 6:
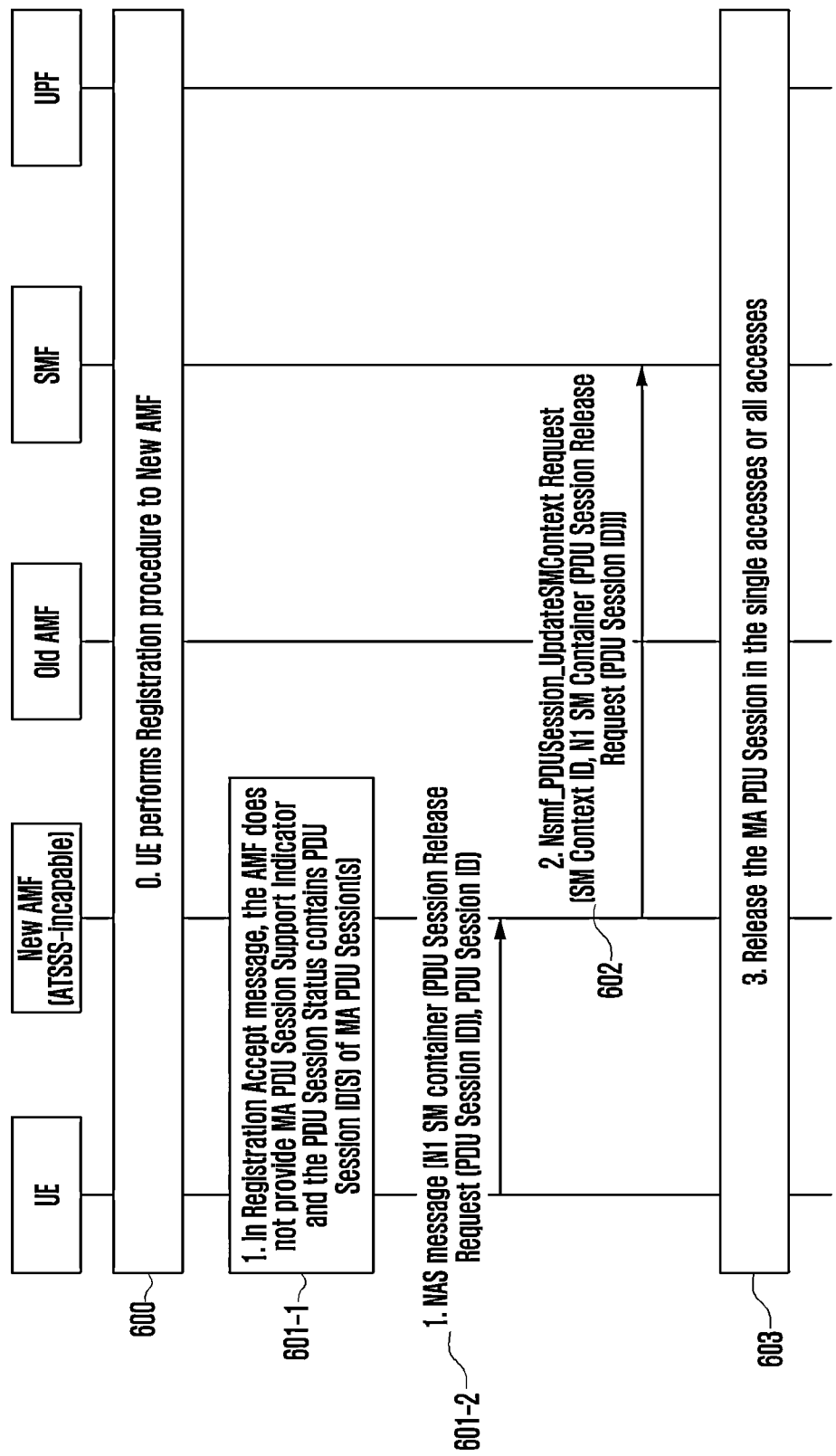
FIG. 6 illustrates a sequence diagram for a procedure for releasing an old MA PDU session on the basis of a PDU session release request of a UE.

FIG. 6 illustrates an MA PDU session release method through an MA PDU session release request of the UE according to an embodiment when the UE is registered in a new AMF which does not support ATSSS.

In step 600, the UE may perform a registration procedure of the new AMF. The registration procedure of the new AMF may be performed to be the same as the registration procedure of the new AMF according to the embodiments of FIGS. 3 and 4.

In step 601, when an MA PDU session support indicator is not included in a registration accept message and a PDU session ID of an MA PDU session exists in a PDU session status of the registration accept message for an access type for which the registration accept message is received (601-1), all of the corresponding PDU session IDs into the UE inserts a PDU session release request message and transmits the PDU session release request message to the AMF (601-2).

In step 602, the new AMF may transfer an N1 SM container received from the UE to the SMF through a Nsmf_PDUSession_UpdateSMContext request message. At this time, the new AMF also transmits an SM context ID mapped to the PDU session ID.

In step 603, the SMF indicates to releases the MA PDU session for all access types.

Figure 7:
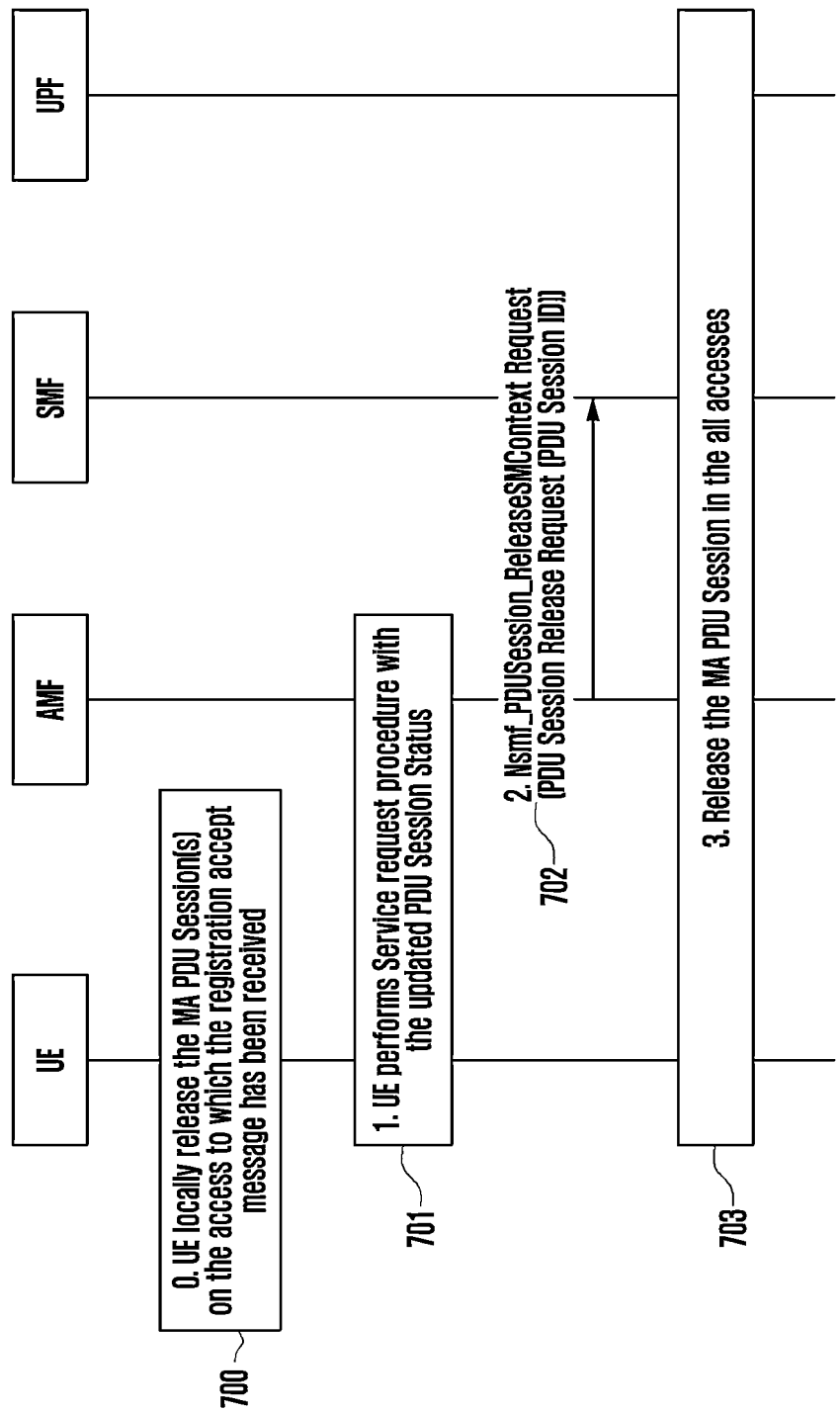
FIG. 7 illustrates a sequence diagram for a procedure in which a UE releases an old MA PDU session through local release.

FIG. 7 illustrates a sequence diagram for a procedure in which the UE releases an old MA PDU session through local release according to an embodiment.

In step 700, the UE performs a registration procedure of the new AMF. When an MA PDU session support indicator is not included in a registration accept message and a PDU session ID of an MA PDU session exists for the access type for which the registration accept message is received, the UE may locally release all of the corresponding PDU session IDs.

When the MA PDU sessions are locally released in step 700, the UE may perform a service request procedure in step 701. At this time, the PDU session ID s of the MA PDU sessions released in step 700 are not included in the PDU session status.

In step 702, the new AMF may transfer an N1 SM container received from the UE to the SMF through a Nsmf_PDUSession_ReleaseSMContext request message. At this time, the new AMF also transmits an SM context ID mapped to the PDU session ID.

In step 703, the SMF may perform MA PDU session release for all access types.

Figure 8:
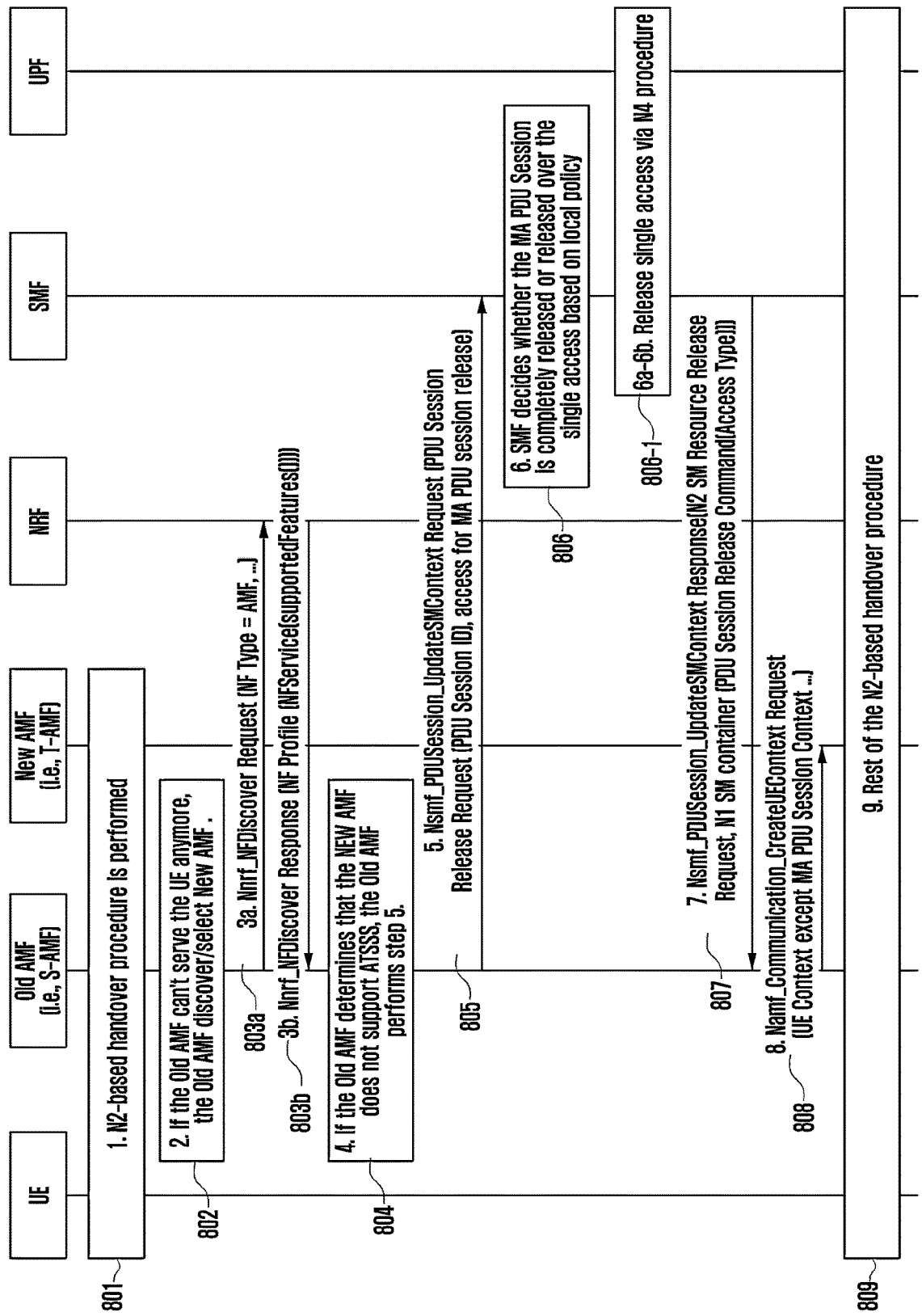
FIG. 8 illustrates a sequence diagram for a procedure in which an old AMF releases an old MA PDU session on the basis of an update SM context service when an AMF is changed due to N2 handover.

FIG. 8 illustrates a method by which, when an AMF of the UE is changed into an AMF which does not support ATSSS during N2-based handover, an old AMF releases an old MA PDU session through UpdateSMContext according to an embodiment.

Referring to FIG. 8, in step 801, an N2 handover procedure may be performed. An old RAN (that is, a source RAN or an S-RAN) may transmit a handover-required message along with a target ID to an old AMF (that is, a source AMF or an S-AMF).

When it is determined that the old AMF cannot support the UE anymore, the old AMF may perform AMF discovery/selection to select a new AMF (that is, a target AMF or a T-AMF) in step 802. At this time, the old AMF can perform AMF discovery/selection through a Network Repository Function (NRF) or AMF discovery/selection through AMF local configuration.

When AMF discovery/selection can be performed through the NRF, the old AMF may transmit a Nnrf_NF-Discovery Request message to the NRF in step 803a. The corresponding message may include various query parameters for discovering a new AMF, and an NF type parameter may be configured as an AMF and transmitted.

In step 803b, the NRF may select a new AMF and transmit an NF profile of the corresponding AMF to the old AMF. At this time, the NF profile includes supported features for NF services which the AMF provides (for example, Namf_Communication). The supported features include information on whether ATSSS is supported (that is, MA PDU).

When the MA PDU parameter does not exist in the supported features of the message received in step 803b, the old AMF may determine that new AMF does not support ATSSS in step 804 and perform step 805.

When the old AMF determines that the new AMF does not support ATSSS in step 805, the old AMF identifies whether there is MA PDU session context in UE context of the old AMF. When there is MA PDU session context in UE context, the old AMF may perform an operation for releasing the MA PDU session for the SMF. Specifically, the old AMF may transmit a Nsmf_PDUSession_UpdateSMContext request message to the SMF. The Nsmf_PDUSession_UpdateSMContext request message may include information on an SM context ID, a release indication, and access for MA PDU session release. At this time, the SM context ID is a context identifier for an MA PDU session ID which should be locally released, and is shared between the AMF and the SMF. The release indication is an indicator indicating a release request, and the access for MA PDU session release is an access type which should be released.

At this time, the old AMF may determine that the new AMF does not support ATSSS through the following methods: 1) the case in which there is no MA PDU support indicator in a supported feature of a response message from the NRF of step 803b when AMF discovery/selection through the NRF is supported, 2) the case in which the old AMF had exchanged supported features in the past through communication with the new AMF and the case in which there is no MA PDU support indicator in supported features at that time and information indicating that the new AMF does not support ATSSS is stored on the basis thereof, and 3) the case in which information indicating that the new AMF does not support ATSSS is stored through local configuration of the old AMF.

Upon receiving the message in step 805 from the AMF, the SMF determines whether to release only the access type for receiving the MA PDU session mapped to the SM context ID or release all accesses through a local policy in step 806. The SMF may indicate to the UPF whether to release only the access for the MA PDU session or release all accesses according to the determination result.

The SMF may transmit a Nsmf_PDUSession_UpdateSMContext response message including the result of the request of step 805 to the old AMF in step 807.

Even though the message from the SMF includes a message for making a request for transmission to the UE or the AN, the old AMF does not perform an operation such as transmission in step 808. The old AMF transmits a Namf_Communication_CreateUEContext request message in order to transfer UE context to the new AMF.

At this time, the old AMF does not insert context for successfully released MA PDU sessions into UE context to be transmitted to the new AMF.

In step 809, the remaining procedures for N2-based handover of the UE may be performed. When MA PDU session context missed in the UE context received in step 808 exists in the UE, the UE may locally release the MA PDU session existing only in the UE through a synchronization process with the new AMF.

Figure 9:
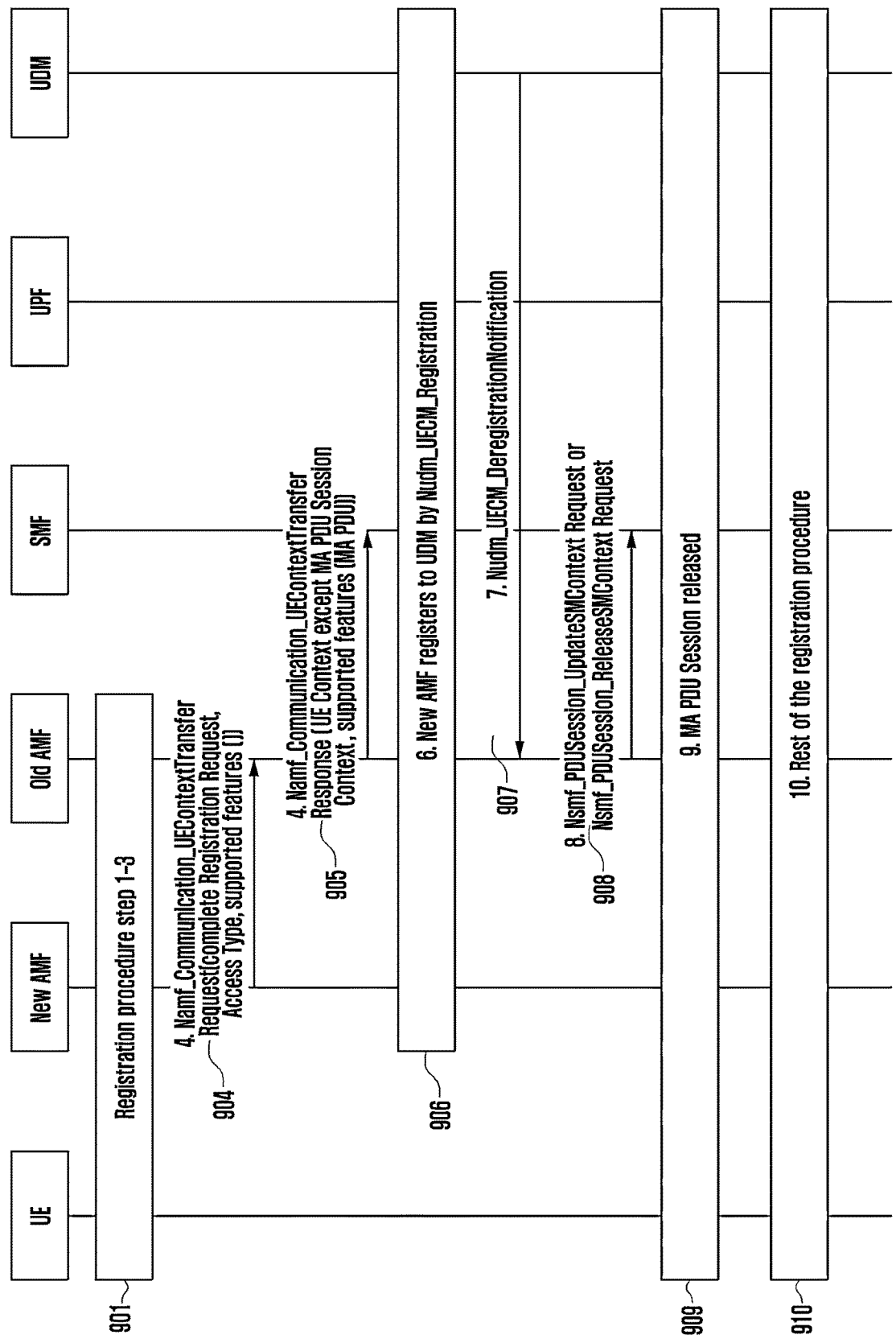
FIG. 9 illustrates a method of releasing an MA PDU session after an old AMF identifies that a UE is successfully registered in a new AMF when the UE makes a request for registration in an AMF which does not support ATSSS.

FIG. 9 illustrates a method of releasing an MA PDU session after the old AMF identifies that the UE is successfully registered in the new AMF according to an embodiment when the UE makes a request for registration in the AMF that does not support ATSSS.

Referring to FIG. 9, in step 901, the UE may transmit a registration request message to the new AMF in order to perform a registration process for the new AMF (steps 1 to 3). Specifically, the UE may transmit an Access Node (AN) message including the registration request message to an AN in step 1, and the AN may determine an AMF in step 2 and transmit an N2 message including the registration request message to the determined AMF (that is, a new AMF) in step 3.

In step 904, the new AMF may transmit a Namf_Communication_UEContextTransfer request message to the old AMF. At this time, the request message may include an access type and supported features of the UE. The supported features include information on whether the new AMF supports ATSSS, and the old AMF may recognize whether the new AMF supports ATS SS on the basis thereof.

In case that it is determined that the new AMF does not support ATSSS in step 904, the old AMF may transmit UE context except for context for the MA PDU session to the new AMF in step 905.

Since the AMF was changed, the new AMF may be registered in Unified Data Management (UDM) through a Nudm_UECM_Registration message (including a Subscription permanent Identifier (SUPI) and an access type) in step 906.

In step 907, the UDM may inform the old AMF which provides the service for the access type of the corresponding UE that the new AMF has been registered through a Nudm_UECM_DeregistrationNotification message (including an SUPI and an access type).

After receiving the message of step 907, the old AMF may make a request for releasing the MA PDU session through a Nsmf_PDUSession_UpdateSMContext request message or a Nsmf_PDUSession_ReleaseSMContext request message to the SMF in step 908. At this time, the messages may include a PDU session ID of the MA PDU session and an access type.

When the access type is specified in the message to the SMF, the SMF may perform release for the corresponding access of the MA PDU in step 909. When the access type is not specified, release for both accesses may be performed.

In step 910, the remaining registration procedures may be performed. The UE receives a registration accept message from the new AMF. At this time, when there is an MA PDU session which is not included in a PDU session status Information Element (IE) of the corresponding message, the UE may locally release the MA PDU session only for the access for which the registration accept message is received or locally release MAPDU sessions for both access types.

Figure 10:
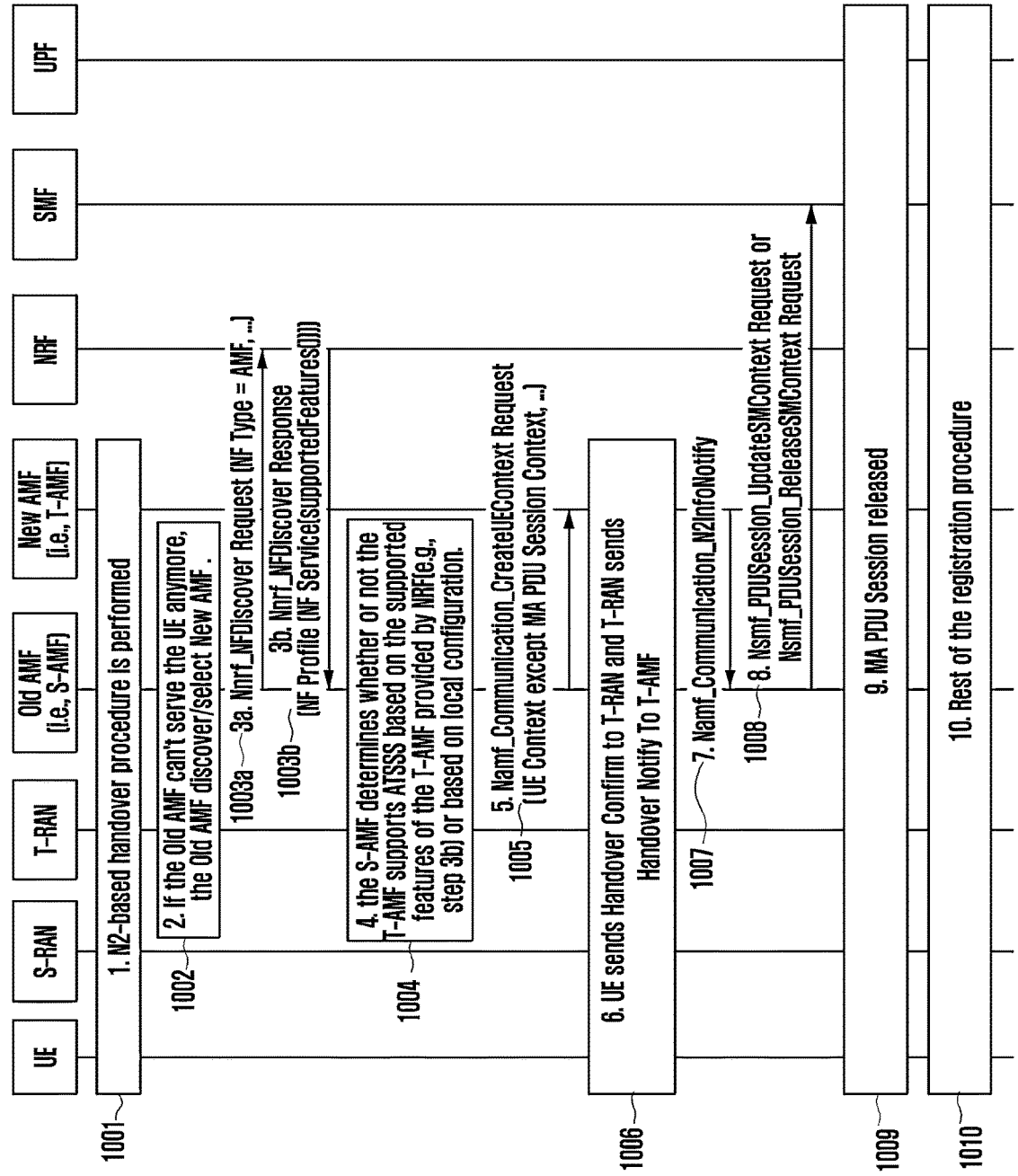
FIG. 10 illustrates a method by which, when an AMF of a UE is changed into a new AMF which does not support ATSSS during N2-based handover, an old AMF (S-AMF) receives a message indicating that the handover for the UE is successfully performed from the new AMF and then releases an MA PDU session.

FIG. 10 illustrates a method by which, when an AMF of the UE is changed into a new AMF which does not support ATSSS during N2-based handover, the old AMF (S-AMF) receives a message indicating that the handover for the UE is successfully performed from the new AMF and then releases the MA PDU session according to an embodiment.

Referring to FIG. 10, in step 1001, the S-RAN may transmit a handover-required message to the S-AMF.

When it is determined that the S-AMF (or old AMF) cannot support the UE anymore, the S-AMF performs AMF discovery/selection and selects a new AMF (that is, T-AMF) in step 1002. At this time, the S-AMF can perform AMF discovery/selection through a Network Repository Function (NRF) or AMF discovery/selection through AMF local configuration.

When AMF discovery/selection can be performed through the NRF, the S-AMF may transmit a Nnrf_NFDiscovery request message to the NRF in step 1003a. The corresponding message may include various query parameters for discovering a new AMF, and an NF type parameter may be configured as the AMF and transmitted.

In step 1003b, the NRF may select the new AMF and transmit an NF profile of the corresponding AMF to the S-AMF. At this time, the NF profile includes supported features for NF services (for example, Namf_Communication) which the AMF provides. The supported features include information indicating whether ATSSS is supported (that is, MA PDU).

In step 1004, the S-AMF may determine whether the T-AMF supports ATSSS. The S-AMF determines that the T-AMF does not support ATSSS in the following cases: 1) the case in which the supported features of the message received in step 1003b do not have an MA PDU, 2) the case in which the T-AMF knows that there is no MA PDU in the supported features of the previous message, and 3) the case in which the T-AMF knows that ATSSS is not supported on the basis of local configuration.

When it is determined that the T-AMF does not support AT SSS, the S-AMF may transmit UE context except for MA PDU session context to the T-AMF in step 1005.

In step 1006, the UE may transmit a Handover Confirm message to the T-RAN and the T-RAN may transmit a Handover Notify message to the T-AMF as the N2 handover procedure.

In step 1007, the T-AMF may transmit a message indicating that the N2 handover for the UE has been successfully performed to the S-AMF.

After receiving the message of step 1007, the S-AMF may make a request for releasing the MA PDU session through a Nsmf_PDUSession_UpdateSMContext request message or a Nsmf_PDUSession_ReleaseSMContext request message to the SMF in step 1008. At this time, the messages may include a PDU session ID of the MA PDU session and an access type.

In step 1009, when the access type is specified in the message to the SMF, the SMF may perform release for the corresponding access of the MA PDU. When the access type is not specified, release for both accesses is performed.

In step 1010, the remaining handover procedures may be performed. The UE receives a registration accept message from the new AMF. At this time, when there is an MA PDU session which is not included in a PDU session status IE of the corresponding message, the UE may locally release the MA PDU session only for the access for which the registration accept message is received or locally release MA PDU sessions for both access types.

Figure 11:
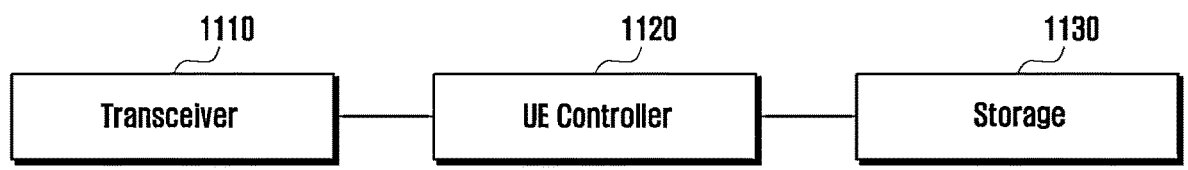
FIG. 11 illustrates a block diagram for the structure of a UE according to an embodiment.

FIG. 11 illustrates a block diagram for the structure of a UE according to an embodiment.

Referring to FIG. 11, the UE may include a transceiver 1110, a UE controller 1120, and a storage unit 1130. In the disclosure, the UE controller 1220 may be defined as a circuit, an application-specific integrated circuit, or at least one processor.

The transceiver 1110 may transmit and receive a signal to and from another network entity. The transceiver 1110 may receive, for example, system information from a base station and receive a synchronization signal or a reference signal.

The UE controller 1120 may control the overall operation of the UE according to an embodiment proposed in the disclosure. For example, the UE controller 1120 may control the signal flow between blocks to perform the operation of the UE according to the aforementioned flowchart.

The storage unit 1130 may store at least one piece of information transmitted and received through the transceiver 1110 and information generated through the UE controller 1120.

Figure 12:
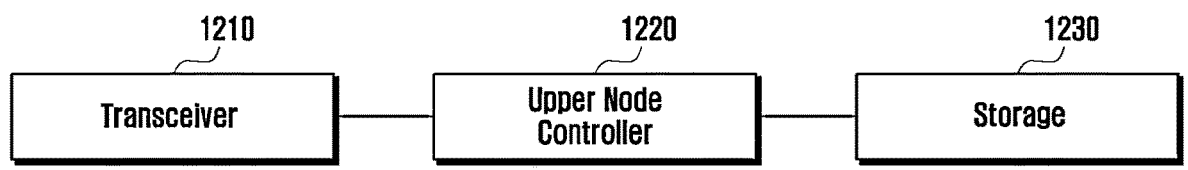
FIG. 12 illustrates a block diagram for the structure of a higher node according to an embodiment.

FIG. 12 illustrates a block diagram for the structure of a higher node according to an embodiment.

The block diagram illustrated in FIG. 12 may be a block diagram of the aforementioned higher nodes, for example, the AMF, the SMF, and the UPF.

In the disclosure, core network entities or network functions such as the AMF, the SMP, and the UPF are all referred to as higher nodes.

Referring to FIG. 12, the higher node may include a transceiver 1210, a higher node controller 1220, and a storage unit 1230. In the disclosure, the higher node controller 1220 may be defined as a circuit, an application-specific integrated circuit, or at least one processor.

The transceiver 1210 may transmit and receive a signal to and from another network entity. The transceiver 1210 may transmit and receive a signal according to an embodiment to and from, for example, adjacent higher nodes.

The higher node controller 1220 may control the overall operation of the higher node according to an embodiment proposed in the disclosure. For example, the higher node controller 1220 may control the signal flow between blocks to perform the operation of the higher node according to the aforementioned flowchart.

The storage unit 1230 may store at least one piece of information transmitted and received through the transceiver 1210 and information generated through the higher node controller 1220.

According to the embodiments, when a UE registered in an AMF which supports AT SSS is registered in an AMF which does not support ATSSS, it is possible to efficiently release old MA PDU sessions to perform smooth communication.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access, via an external port, a device which performs embodiments of the disclosure. Further, a separate storage device on the communication network may access a device which performs embodiments of the disclosure.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a session management function (SMF) entity in a wireless communication system, the method comprising:
   receiving, from a first access and mobility management function (AMF) entity, a first message requesting to release a multi-access packet data unit (MA PDU) session for a terminal, if a second AMF entity does not support an access traffic steering, switching, splitting (ATSSS) function is determined based on information on supported features of the second AMF entity; and
   releasing the IA PDU session based on the first message, wherein, in case that the second AMF entity does not support the ATSSS function based on the information, a second message including a user equipment (UE) context is delivered to the second AMF entity, and the UE context does not include a context for the MA PDU session.

2. The method of claim 1, wherein the releasing further comprising:
   in case that the first message includes information on an access of the MA PDU session for releasing, releasing the access of the MA PDU session based on the information on the access of the MA PDU session for releasing.

3. The method of claim 1, wherein the releasing further comprising:
   in case that the first message does not include the information on an access of the MA PDU session for releasing, releasing both accesses of the MA PDU session based on the first message.

4. The method of claim 1, wherein a third message including the information on supported features of the second AMF entity is transmitted from the second AMF entity to the first AMF entity, in case that a registration request message is transmitted from the terminal to the second AMF entity, and
   wherein the third message is a message for requesting to transfer the UE context stored in the first AMF entity to the second AMF entity.

5. The method of claim 1, wherein the information on supported features of the second AMF entity is transmitted from a network repository function (NRF) entity to the first AMF entity, and
   wherein the first AMF entity is a source AMF entity associated with a handover, and the second AMF entity is a target AMF entity associated with the handover.

6. The method of claim 5, wherein the MA PDU session is released after a fourth message notifying that the handover is successful is received at the first AMF entity.

7. The method of claim 5, wherein the information is included in a network function (NF) profile of the second AMF entity.

8. A session management function (SMF) entity in a wireless communication system, the SMF entity comprising:
   a transceiver configured to transmit and receive a signal; and
   at least one processor coupled with the transceiver and configured to:
   receive, from a first access and mobility management function (AMF) entity, a first message requesting to release a multi-access packet data unit (MA PDU) session for a terminal, if a second AMF entity does not support an access traffic steering, switching, splitting (ATSSS) function is determined based on information on supported features of the second AMF entity, and
   release the MA PDU session based on the first message, wherein, in case that the second AMF entity does not support the ATSSS function based on the information, a second message including a user equipment (UE) context is delivered to the second AMF entity, and the UE context does not include a context for the MA PDU session.

9. The SMF entity of claim 8, wherein the at least one processor is further configured to, in case that the first message includes information on an access of the MA PDU session for releasing, release the access of the MA PDU session based on the information on the access of the MA PDU session for releasing.

10. The SMF entity of claim 8, wherein the at least one processor is further configured to, in case that the first message does not include the information on an access of the MA PDU session for releasing, releasing both accesses of the MA PDU session based on the first message.

11. The SMF entity of claim 8, wherein a third message including the information on supported features of the second AMF entity is transmitted from the second AMF entity to the first AMF entity, in case that a registration request message is transmitted from the terminal to the second AMF entity, and
wherein the third message is a message for requesting to transfer the UE context stored in the first AMF entity to the second AMF entity.

12. The SMF entity of claim 8, wherein the information on supported features of the second AMF entity is transmitted from a network repository function (NRF) entity to the first AMF entity, and
wherein the first AMF entity is a source AMF entity associated with a handover, and the second AMF entity is a target AMF entity associated with the handover.

13. The SMF entity of claim 12, wherein the MA PDU session is released after a fourth message notifying that the handover is successful is received at the first AMF entity.

14. The SMF entity of claim 12, wherein the information is included in a network function (NF) profile of the second AMF entity.

\* \* \* \* \*